Dec. 16, 1952  R. G. LE TOURNEAU  2,621,964
REAR DUMP WAGON

Filed June 7, 1948  3 Sheets-Sheet 1

INVENTOR.
R. G. LeTourneau
BY
ATTYS

INVENTOR.
R. G. LeTourneau
BY
ATTYS

Dec. 16, 1952  R. G. LE TOURNEAU  2,621,964
REAR DUMP WAGON
Filed June 7, 1948  3 Sheets-Sheet 3

INVENTOR.
R. G. LeTourneau
BY
ATTYS

Patented Dec. 16, 1952

2,621,964

UNITED STATES PATENT OFFICE 2,621,964

REAR DUMP WAGON

Robert G. Le Tourneau, Longview, Tex., assignor to R. G. Le Tourneau, Inc., Stockton, Calif., a corporation of California Application June 7, 1948, Serial No. 31,509

3 Claims. (Cl. 298—19)

This invention relates generally to automotive dump wagons, especially rear dump type.

One object of the present invention is to provide a rear dump wagon having a novel, power actuated lift assembly operative to swing the bowl between a normally lowered transport position and a rearwardly tilted dump position.

Another object of the invention is to provide a rear dump wagon, as in the preceding paragraph, in which said power actuated lift assembly comprises a simplified, yet rugged and effective mechanism for the control of the tiltable, rear dump bowl.

A further object of the invention is to provide a rear dump wagon wherein the tiltable, rear dump bowl is directly wheel-supported from the ground, and connected to the remainder of the implement by a straddle-type draft yoke having arms disposed on opposite sides of the bowl and pivoted thereto intermediate its ends and above the wheel axis; the power lift assembly for said bowl comprising a heavy-duty control cable connected to the bowl on the under side adjacent its rear end and centrally of its sides, and thence extending forwardly and upwardly to connection with a reversible electric motor actuated winch unit mounted on the cross beam of the draft yoke with the cable drum in a central position on said beam.

It is also an object of the invention to provide a rear dump wagon which includes novel stop means to limit tilting of the bowl and prevent its passing vertical dead center, which would be undesirable.

A further object of the invention is to provide a rugged and reliable rear dump wagon, and one which will be exceedingly effective for the purpose for which it is designed.

These objects are accomplished by means of such structure and relative arrangement of parts as will fully appear by a perusal of the following specification and claims.

Referring now more particularly to the characters of reference on the drawings, the rear dump wagon comprises a material carrying bowl or body 1 open on top and at its rear end; said bowl 1 decreasing in width at its rear end portion by reason of laterally inward offsets 2, whereby pneumatic-tire rear wheels 3 can be disposed to opposite sides of the bowl adjacent the rear without undue projection.

Figure 3:
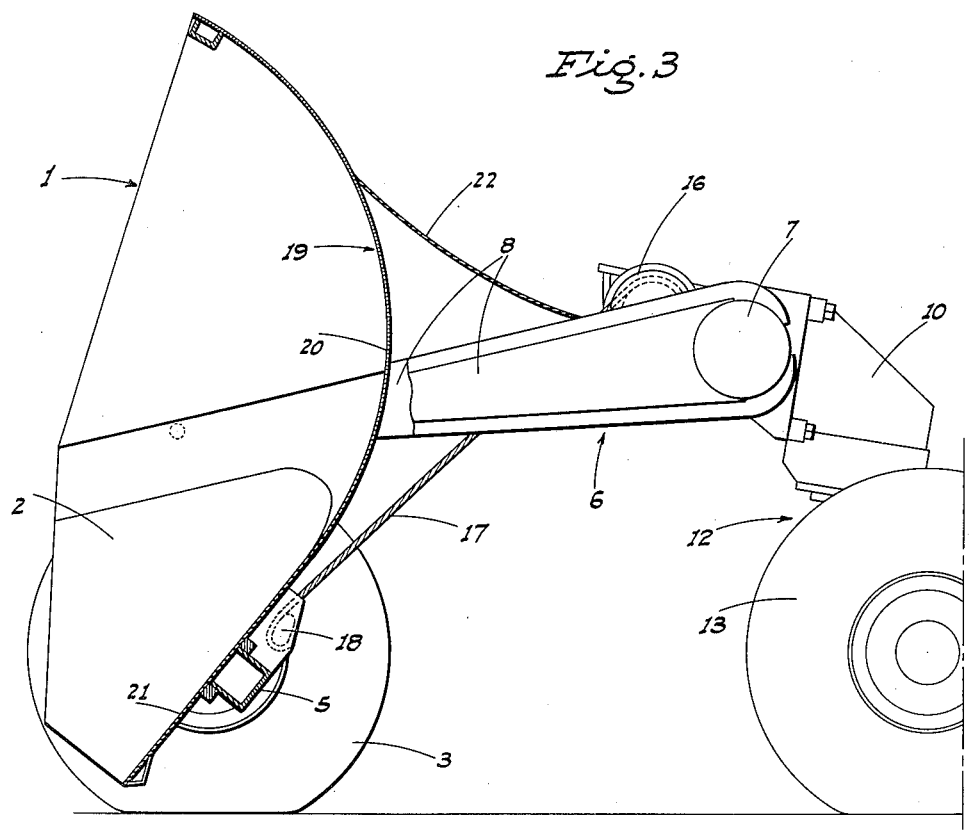
Fig. 3 is a side elevation, partly in section, showing the bowl tilted to dump position.
Figure 4:
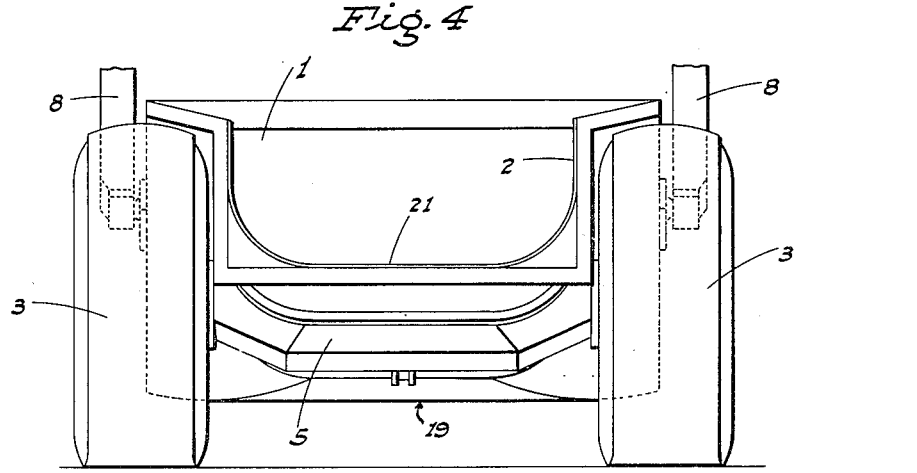
Fig. 4 is a rear end view of the wheel-supported bowl of the wagon in lowered transport position.

The wheels 3 are carried on wheel spindles 4, which in turn are supported by an axle 5 formed as a unitary part of said bowl from side to side thereof, as shown in Figs. 3 and 4, so that the bowl or body structure is stiffened and braced by the axle, and the latter in turn derives some of its strength from the body.

The bowl 1 is straddled from the front by a generally U-shaped draft yoke, indicated generally at 6; such draft yoke including a tubular front cross beam 7 having draft arms 8 projecting rearwardly from opposite ends thereof.

The tubular front cross beam 7 is disposed ahead of the bowl 1 and the draft arms 8 extend rearwardly along opposite sides of the bowl exteriorly thereof; said arms being connected at their rear ends by ball and socket units 9 to corresponding sides of said bowl. The ball and socket units 9 are disposed intermediate the top and bottom of the bowl and at a point some distance ahead of the axis of the wheels 3.

The draft yoke 6 is connected, centrally of beam 7, by a coupling and power steering unit 10 with the main case 11 of a two-wheel tractor 12 which includes transversely spaced pneumatic-tire wheels 13.

Figure 1:
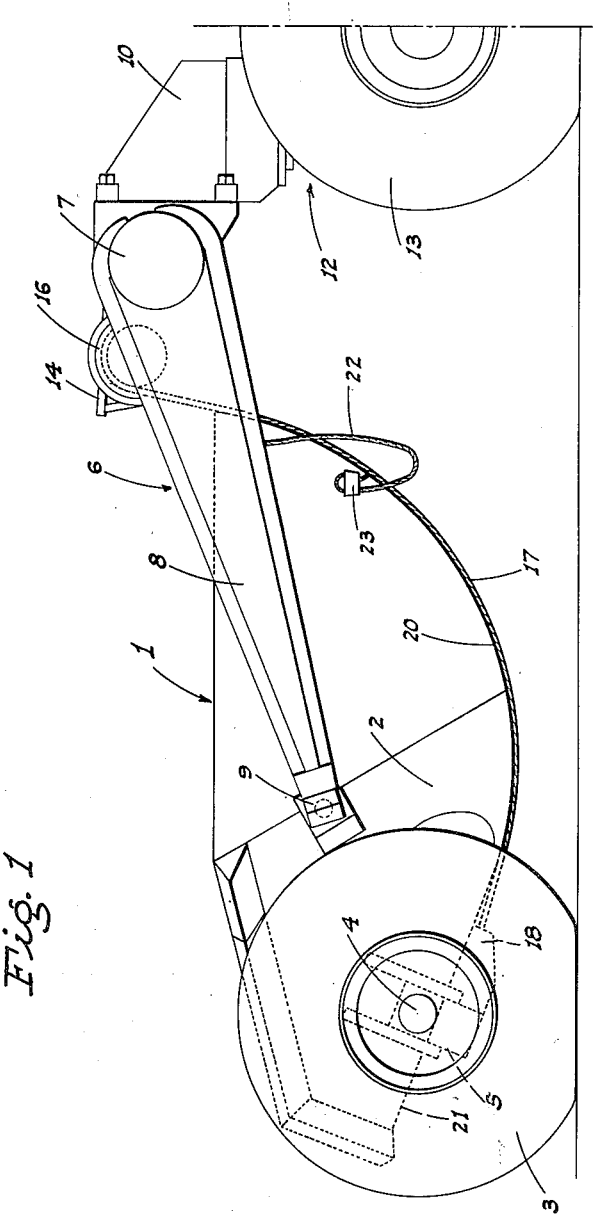
Fig. 1 is a side elevation of the rear dump wagon in lowered transport position.
Figure 2:
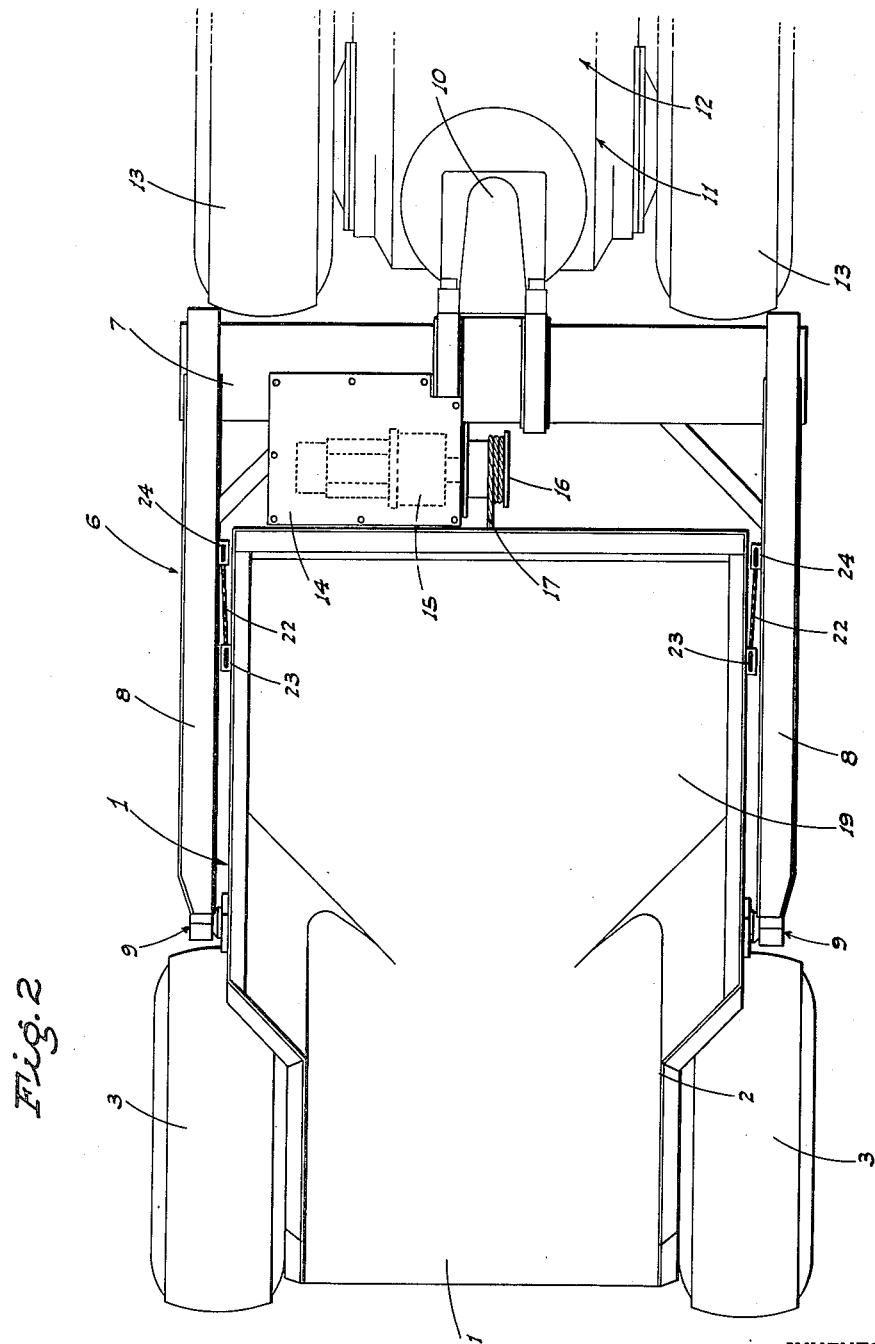
Fig. 2 is a plan view of the rear dump wagon.

The bowl 1 is adapted to be moved between its lowered transport position of Fig. 1 and its raised or tilted dumping position of Fig. 3 by means of the following power-actuated lift assembly:

The tubular front cross beam 7 of the draft yoke 6 is fitted with a fixed platform 14, and a reversible, electric motor driven winch unit 15 is mounted on said platform.

The winch unit 15 includes a transverse axis cable drum 16 disposed centrally of the ends of the front beam 7 and slightly rearwardly thereof in the clear.

A heavy-duty control cable 17 leads from the cable drum 16 downwardly under the bowl 1, centrally of the sides of the latter, to an anchor 18 on the bottom 19 of said bowl adjacent its rear end.

Ahead of the anchor 18 the bowl bottom 19 is arcuate with the concave side uppermost; this arcuate portion of the bowl being indicated at 20. Rearwardly of the anchor 18 the bottom 19 is generally straight lengthwise, as at 21, with such straight portion at a rearward and upward incline when the bowl is in lowered transport position. This inclination of the straight bottom portion 21 is for the prevention of rear end spillage when the bowl is in lowered transport position and carrying material.

The heavy-duty control cable 17 extends from the cable drum 16 at a downward and rearward inclination to a point of substantial tangency with the arcuate bottom portion 20 of the bowl, and thence said cable extends along and conforms to said bottom portion up to the anchor 18.

With this arrangement, a positive and effective tilting control of the bowl 1 can be accomplished, with the most effective leverage. It will be recognized that upon operation of the winch unit 15 in a direction to wind the control cable 17 onto the cable drum 16, the bowl is tilted upwardly at its front end about the ball and socket units 9 as an axis; the maximum leverage then being exerted so that a heavily loaded bowl can be raised without difficulty.

As the cable continues to run onto the drum, the bowl 1 is further tilted toward its discharge or dumping position; the normally forward portion of the bowl swinging upwardly and rearwardly, while the normally rearward portion of the bowl swings downwardly and forwardly, carrying the rear wheels 3 therewith. This causes an actual foreshortening of the implement, which is advantageous with respect to dumping operations.

The described power actuated lift assembly, including the winch unit 15, cable drum 16, and control cable 17, connected between said drum and the bowl bottom in the manner described, provides a simplified, yet more effective mechanism for the purpose than with any other known type of lifting mechanism; the leverage of said cable 17 with respect to tilting of the bowl being extremely effective without overloading the winch.

Another advantage of the described lift assembly is that it permits the bowl to be raised to a very high tilted or discharge position.

When the bowl reaches a predetermined position of maximum tilt, the following stop means comes into play to prevent the bowl from passing vertical dead-center:

The stop means comprises lengths of flexible cable 22 connected between anchors 23 on the sides of the bowl adjacent the front thereof, and other anchors 24 on the inner faces of the draft arms 8. The flexible stop cables 22 are normally slack, as in Fig. 1, but when the bowl approaches its position of maximum tilt, as in Fig. 3, the cables 22 become taut, limiting further tilting of said bowl and preventing its passage beyond vertical dead-center.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following are claimed as new and useful, and upon which Letters Patent are desired:

1. A rear dump wagon comprising a body, a pair of transversely spaced wheels supporting the body intermediate its ends and about the axis of which the body is tiltable, a tractor mounted draft yoke including side arms projecting rearwardly from the tractor and pivoted at their rear end on the sides of the body at a point thereon well above the axis of tilting of the body, a winch-drum on the yoke ahead of the body and above the axis of tilting thereof, and a pull cable extending from the drum to a connection with the body at a point thereon such as to cause winding of the cable on the drum to lift and tilt the body rearwardly about said axis and at the same time exert a forward pull on the wheels whereby the yoke arms are placed under compression and an additional backward tilting pressure is imparted to the body.

2. A rear dump wagon comprising a body, a pair of transversely spaced wheels having a relatively turnable axle extending therebetween on which the bottom of the body is secured at a point from its rear end a distance substantially the same as the height of the wheel axis from the ground whereby to enable the body to be swung up rearwardly to a near-vertical position, a vertically swingable tractor-mounted draft yoke including side arms projecting rearwardly from the tractor and pivoted on the sides of the body ahead of and above the axle, a pull cable connected to the bottom of the body at a point adjacent but ahead of the axle and extending thence forwardly and upwardly, and a winch on the yoke at the front of the body and including a drum about which the forward portion of the cable passes; the cable being disposed in contact with the bottom of the body to the front upper end of the same when the body is in a lowered carrying position whereby the body forwardly of the axis is cable-supported in such position and the winding of the cable on the drum imparts a lifting movement to the body.

3. A rear dump wagon comprising a body having an axle, a pair of transversely spaced wheels rotatably mounted on the axle, the body being tiltable about the axis of said wheels, a tractor mounted draft yoke including side arms projecting rearwardly from the tractor and pivoted at their rear ends on the sides of the body at a point thereon above the axis of tilting of the body, a power rotated drum on the yoke ahead of the body and above the axis of tilting thereof, and a pull cable connected between the drum and a point on the bottom of the body near said axle, part of the cable length being in contact with the lower surface of said body whereby the body is tilted upon rotation of the drum in a direction to exert a pull on the cable; the axle being integral with the body whereby said axle and body strengthen each other.

ROBERT G. LE TOURNEAU.

REFERENCES CITED

The following references are of record in the file of this patent:

UNITED STATES PATENTS

| Number | Name | Date |
|---|---|---|
| 605,029 | Taylor | May 31, 1898 |
| 674,959 | Carroll | May 28, 1901 |
| 752,766 | Exterkamp | Feb. 23, 1904 |
| 818,737 | Brooks | Apr. 24, 1906 |
| 1,344,100 | Tait | June 22, 1920 |
| 1,364,586 | Sale | Jan. 4, 1921 |
| 1,770,086 | Phaneuf | July 8, 1930 |
| 2,131,326 | Kaster | Sept. 27, 1938 |
| 2,360,823 | Austin | Oct. 24, 1944 |
| 2,393,016 | Black | Jan. 15, 1946 |
| 2,418,588 | Le Tourneau | Apr. 8, 1947 |
| 2,495,354 | Spearing et al. | Jan. 24, 1950 |
| 2,561,211 | Le Tourneau | July 17, 1951 |

FOREIGN PATENTS

| Number | Country | Date |
|---|---|---|
| 325,888 | France | May 11, 1903 |